(12) United States Patent
Ramakrishnan et al.

(10) Patent No.: US 11,777,794 B2
(45) Date of Patent: Oct. 3, 2023

(54) COMMISSIONING A CENTRAL CONTROLLER IN A CLOUD RADIO ACCESS NETWORK

(71) Applicant: CommScope Technologies LLC, Hickory, NC (US)

(72) Inventors: Shanthakumar Ramakrishnan, Westford, MA (US); Devaraj Sambandan, Bengaluru (IN)

(73) Assignee: CommScope Technologies LLC, Hickory, NC (US)

( * ) Notice: Subject to any disclaimer, the term of this patent is extended or adjusted under 35 U.S.C. 154(b) by 358 days.

(21) Appl. No.: 17/190,794

(22) Filed: Mar. 3, 2021

(65) Prior Publication Data

US 2021/0329434 A1  Oct. 21, 2021

Related U.S. Application Data

(60) Provisional application No. 63/032,964, filed on Jun. 1, 2020.

(30) Foreign Application Priority Data

Apr. 18, 2020  (IN) .............................. 202041016757

(51) Int. Cl.
  *H04W 4/50*  (2018.01)
  *H04L 41/0806*  (2022.01)
  (Continued)

(52) U.S. Cl.
  CPC ......... *H04L 41/0806* (2013.01); *H04W 12/06* (2013.01); *H04W 76/10* (2018.02); *H04W 88/12* (2013.01)

(58) Field of Classification Search
  CPC ............. H04L 41/0806; H04L 63/0272; H04L 63/0823; H04W 12/06; H04W 76/10;
  (Continued)

(56) References Cited

U.S. PATENT DOCUMENTS

2016/0037550 A1\* 2/2016 Barabell ........... H04W 72/1263
                                                                    455/450
2017/0026335 A1\* 1/2017 Dhulipala ........... H04L 41/0806
                  (Continued)

FOREIGN PATENT DOCUMENTS

WO    2019072402 A1    4/2019

OTHER PUBLICATIONS

International Searching Authority, "International Search Report and Written Opinion from PCT Application No. PCT/US2021/020621", from Foreign Counterpart to U.S. Appl. No. 17/190,794, filed Jun. 24, 2021, pp. 1 through 8, Published: WO.

*Primary Examiner* — Walli Z Butt
(74) *Attorney, Agent, or Firm* — Fogg & Powers LLC

(57) ABSTRACT

A cloud radio access network (C-RAN) includes a plurality of remote units (RUs), each with a wireless transceiver to exchange RF signals with at least one UE. The C-RAN also includes a central controller communicatively coupled to the plurality of RUs via a fronthaul comprising one or more ETHERNET switches. The central controller is communicatively coupled to an activation server via a backhaul network. The central controller also includes at least one processor configured to, following initial power up, establish a connection to the activation server indicated by activation server information pre-configured on the central controller. The at least one processor is also configured to receive a commissioning package, which includes commissioning information, from the activation server. The at least one processor is also configured to configure the central controller based on the commissioning information.

36 Claims, 9 Drawing Sheets

(51) Int. Cl.
*H04W 12/06* (2021.01)
*H04W 76/10* (2018.01)
*H04W 88/12* (2009.01)

(58) Field of Classification Search
CPC . H04W 88/12; H04W 12/069; H04W 88/085; H04W 88/18; H04W 92/14
See application file for complete search history.

(56) References Cited

U.S. PATENT DOCUMENTS

| | | |
|---|---|---|
| 2018/0167993 A1* | 6/2018 | Thakkar ................ H04W 76/16 |
| 2019/0182716 A1 | 6/2019 | Futaki et al. |
| 2019/0223055 A1* | 7/2019 | Bor Yaliniz .......... H04W 48/16 |
| 2019/0289470 A1 | 9/2019 | Vaidya et al. |
| 2020/0029247 A1 | 1/2020 | Chao et al. |
| 2020/0077454 A1 | 3/2020 | Schliwa-Bertling et al. |

* cited by examiner

COMMISSIONING A CENTRAL CONTROLLER IN A CLOUD RADIO ACCESS NETWORK

CROSS-REFERENCE TO RELATED APPLICATIONS

This application claims the benefit of Indian Provisional Patent Application Serial No. 202041016757 filed on Apr. 18, 2020, entitled "COMMISSIONING A CENTRAL CONTROLLER IN A CLOUD RADIO ACCESS NETWORK"; and U.S. Provisional Patent Application Ser. No. 63/032,964 filed on Jun. 1, 2020, entitled "COMMISSIONING A CENTRAL CONTROLLER IN A CLOUD RADIO ACCESS NETWORK", the entirety of both of which are incorporated herein by reference.

BACKGROUND

In a distributed radio access network (RAN), geographically-separate remote units are controlled by a central controller and provide wireless service to nearby user equipment (UEs). A central controller needs to be commissioned with certain information before the distributed RAN can provide wireless service to UEs. Therefore, present systems and methods are described herein for commissioning a central controller in a cloud radio access network (C-RAN).

SUMMARY

A cloud radio access network (C-RAN) includes a plurality of remote units (RUs), each with a wireless transceiver to exchange RF signals with at least one UE. The C-RAN also includes a central controller communicatively coupled to the plurality of RUs via a fronthaul comprising one or more ETHERNET switches. The central controller is communicatively coupled to an activation server via a backhaul network. The central controller also includes at least one processor configured to, following initial power up, establish a connection to the activation server indicated by activation server information pre-configured on the central controller. The at least one processor is also configured to receive a commissioning package, which includes commissioning information, from the activation server. The at least one processor is also configured to configure the central controller based on the commissioning information.

DRAWINGS

Understanding that the drawings depict only exemplary configurations and are not therefore to be considered limiting in scope, the exemplary configurations will be described with additional specificity and detail through the use of the accompanying drawings, in which.

In accordance with common practice, the various described features are not drawn to scale but are drawn to emphasize specific features relevant to the exemplary configurations.

DETAILED DESCRIPTION

In a typical Third Generation Partnership Project (3GPP) Fourth Generation (4G) C-RAN, baseband controller unit(s) communicate with remote units (RUs), which provide wireless service to items of user equipment (UEs). In a typical 3GPP Fifth Generation (5G) C-RAN, there may be further logical and/or physical splits in the devices (e.g., centralized unit(s) (CU(s)), distributed unit(s) (DU(s)), and remote units (RUs)), which are interfaced together to enable and implement RAN functions. As used herein, the term "central controller" (or CU for short) can refer to a 4G baseband controller, a 5G centralized unit, and/or a 5G distributed unit.

Network devices may be commissioned by loading and configuring them with information used to communicate with other devices. Central controllers in a C-RAN may not be manufactured for a specific wireless network operator, and therefore may need to be commissioned with information necessary to communicate with the intended operator's network, at least some of which is specific to the operator and/or the C-RAN deployment location. Conventional methods of commissioning a central controller (in a C-RAN) include sending a technician to manually setup the central controller with this information. However, this is labor-intensive work and requires the technician possess technical knowledge of various aspects in and about the system. As used herein, an "operator" is an entity that implements a wireless network to which customers subscribe for wireless service.

In contrast, the present systems and methods provide a way for the central controller, when switched on, to automatically (e.g., without manual user intervention) contact an online service (e.g., implemented in the cloud) and download commissioning information for its specific operator and/or location/deployment. For example, the central controller may download the information and start initializing its services while visually displaying (e.g., to an on-site technician) the status of every service required for the C-RAN to become operational. This eases the commissioning flow by making the commissioning less labor-intensive than manual configuration. The automatic commissioning would therefore require less-skilled technicians to be on-site or, optionally, no technician at all after the central controller has been (1) connected to the RUs via fronthaul network; (2) connected to a backhaul network; and/or (3) powered on.

Example 4G C-RAN

Figure 1A:
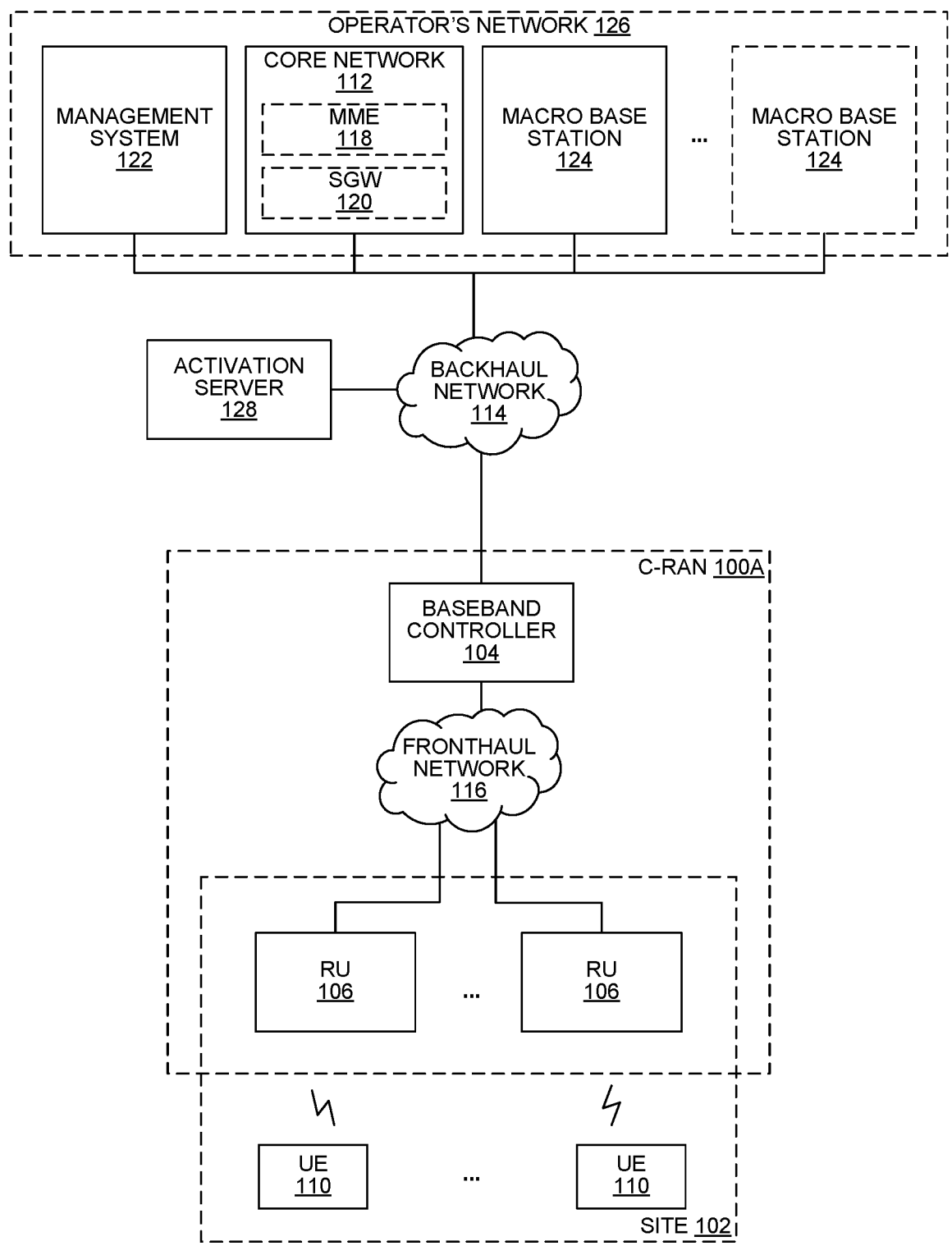
FIG. 1A is a block diagram illustrating an exemplary configuration of a system implementing data analysis and/or configuration of a C-RAN.

FIG. 1A is a block diagram illustrating an exemplary configuration of a communication C-RAN 100A implementing data analysis and/or configuration of a cloud radio access network (C-RAN) 100A (point-to-multipoint distributed base station). C-RAN architecture employs at least one baseband unit 104 and one or more remote units 106, also referred to as "remote units," "RUs," "radio points", or "RPs," which serve at least one cell. It should be noted that the Figures herein are illustrated with different numbers of RUs 106, however, a C-RAN 100A can include any number of RUs 106, e.g., up to hundreds. In other words, the number of RUs 106 illustrated in the Figures is not meant to be limiting.

The RUs 106 may be deployed at a site 102 to provide wireless coverage and capacity for one or more wireless network operators. The site 102 may be, for example, a building or campus or other grouping of buildings (used, for example, by one or more businesses, governments, other enterprise entities) or some other public venue (such as a hotel, resort, amusement park, hospital, shopping center, airport, university campus, arena, or an outdoor area such as a ski area, stadium, or a densely-populated downtown area). In some configurations, the site 102 is at least partially (and optionally entirely) indoors, but other alternatives are possible. In some configurations, multiple C-RANs 100A may be deployed at a single site 102, each with its own set of baseband controller 104 and RUs 106.

The baseband unit 104 is one type of central controller, and is also referred to here as "baseband controller" 104, or just "controller" or "BC". Each remote unit (RU) 106 may include or be coupled to at least one antenna used to radiate downlink RF signals to user equipment (UEs) 110 and receive uplink RF signals transmitted by UEs 110. The baseband controller 104 may optionally be physically located remotely from the site 102, e.g., in a centralized bank of baseband controllers 104. Additionally, the RUs 106 may be physically separated from each other within the site 102, although they are each communicatively coupled to the baseband controller 104 via a fronthaul network 116 (or just "fronthaul"). Communication relating to L1 functions generally relies on the fronthaul network 116 interface.

Each UE 110 may be a computing device with at least one processor that executes instructions stored in memory, e.g., a mobile phone, tablet computer, mobile media device, mobile gaming device, laptop computer, vehicle-based computer, a desktop computer, etc. Each baseband controller 104 and RU 106 may be a computing device with at least one processor that executes instructions stored in memory.

The C-RAN 100A may optionally implement frequency reuse where the same frequency resource(s) are used for multiple sets of UEs 110, each set of UEs 110 being under a different, geographically diverse set of RUs 106.

The C-RAN 100A is coupled to a core network 112 of one or more wireless network operators over an appropriate backhaul network 114. For example, the Internet may be used as the backhaul network 114 between the C-RAN 100A and each core network 112. However, it is understood that the backhaul network 114 can be implemented in other ways. Communication relating to L3 functions generally relies on the backhaul network 114 interface. Each of the backhaul network 114 and/or the fronthaul network 116 described herein may be implemented with one or more network elements, such as switches, routers, and/or other networking devices. For example, the backhaul network 114 and/or the fronthaul network 116 may be implemented as a switched ETHERNET network.

The C-RAN 100A may be implemented as a Long Term Evolution (LTE) radio access network providing wireless service using the LTE air interface. LTE is a standard developed by the 3GPP standards organization. In this configuration, the baseband controller 104 and RUs 106 together are used to implement an LTE Evolved Node B (also referred to here as an "eNodeB" or "eNB"). An eNB may be used to provide UEs 110 with mobile access to the wireless network operator's core network 112 to enable UEs 110 to wirelessly communicate data and voice (using, for example, Voice over LTE (VoLTE) technology). However, it should be noted that the present systems and methods may be used with other wireless protocols, e.g., a C-RAN may be implemented as a 3GPP 5G RAN providing wireless service using a 5G air interface, as described below.

Also, in an exemplary LTE configuration, each core network 112 may be implemented as an Evolved Packet Core (EPC) 112 comprising standard LTE EPC network devices such as, for example, a mobility management entity (MME) 118 and a Serving Gateway (SGW) 120 and, optionally, a Home eNB gateway (HeNB GW) (not shown) and a Security Gateway (SeGW or SecGW) (not shown).

Moreover, in an exemplary LTE configuration, each baseband controller 104 may communicate with the MME 118 and SGW 120 in the EPC core network 112 using the LTE S1 interface and communicates with eNBs using the LTE X2 interface. For example, the baseband controller 104 can communicate with an outdoor macro eNB (not shown) via the LTE X2 interface.

Each baseband controller 104 and remote unit 106 can be implemented so as to use an air interface that supports one or more of frequency-division duplexing (FDD) and/or time-division duplexing (TDD). Also, the baseband controller 104 and the remote units 106 can be implemented to use an air interface that supports one or more of the multiple-input-multiple-output (MIMO), single-input-single-output (SISO), single-input-multiple-output (SIMO), and/or beam forming schemes. For example, the baseband controller 104 and the remote units 106 can implement one or more of the LTE transmission modes. Moreover, the baseband controller 104 and the remote units 106 can be configured to support multiple air interfaces and/or to support multiple wireless operators.

In some configurations, in-phase, quadrature-phase (I/Q) data representing pre-processed baseband symbols for the air interface is communicated between the baseband controller 104 and the RUs 106. Communicating such baseband I/Q data typically requires a relatively high data rate fronthaul.

In some configurations, a baseband signal can be pre-processed at a source RU 106 and converted to frequency domain signals (after removing guard band/cyclic prefix data, etc.) in order to effectively manage the fronthaul rates, before being sent to the baseband controller 104. Each RU 106 can further reduce the data rates by quantizing such frequency domain signals and reducing the number of bits used to carry such signals and sending the data. In a further simplification, certain symbol data/channel data may be fully processed in the source RU 106 itself and only the resultant information is passed to the baseband controller 104.

The Third Generation Partnership Project (3GPP) has adopted a layered model for the LTE radio access interface. Generally, some combination of the baseband controller 104 and RUs 106 perform analog radio frequency (RF) functions for the air interface as well as digital Layer 1 (L1), Layer 2 (L2), and Layer 3 (L3) (of the 3GPP-defined LTE radio access interface protocol) functions for the air interface. Any suitable split of L1-L3 processing (between the baseband controller 104 and RUs 106) may be implemented. Where baseband signal I/Q data is fronthauled between the baseband controller 104 and the RUs 106, each baseband controller 104 can be configured to perform all or some of the digital L1, L2, and L3 processing for the air interface. In this case, the L1 functions in each RU 106 is configured to implement all or some of the digital L1 processing for the air interface.

Where the fronthaul network 116 is not able to deliver the data rate need to front haul (uncompressed) I/Q data, the I/Q data can be compressed prior to being communicated over the fronthaul network 116, thereby reducing the data rate needed communicate such I/Q data over the fronthaul network 116.

Data can be fronthauled between the baseband controller 104 and RUs 106 in other ways, for example, using fronthaul interfaces and techniques specified in the Common Public Radio Interface (CPRI) and/or Open Base Station Architecture Initiative (OBSAI) family of specifications.

A wireless operator may also implement at least one management system 122 (e.g., a HeNB management system (HeMS) and/or a device management system (DMS)), which is used to provide configuration to and receive information from the C-RAN 100A. In some configurations, the management system 122 is an operations, administration, and management (OAM) system/network.

A wireless network operator may implement an operator's network 126 that includes one or more macro base stations 124, which are non-distributed base stations providing wireless service to nearby UEs 110. The operator's network 126 may include the management system 122 and/or the core network 112. Optionally, the operator's network 126 may also include at least one security gateway (not shown) that is used by external computing devices (e.g., a baseband controller 104 or other central controller) when communicating with the operator's network 126. For example, a first security gateway may be used when accessing the management system 122 (e.g., for OAM traffic) and a second security gateway may be used when accessing the core network 112 (e.g., for data bearer traffic). Furthermore, the operator's network 126 may include a certificate authority server (or just "certificate authority") that issues a certificate to the baseband controller 104 and is accessed by a third security gateway.

Optionally, one or more small cells may also be implemented in the operator's network 126. Small cells are generally lower-power, shorter-range, and can serve fewer max concurrent users than macro base stations 124. For example, small cell(s) may be used to fill in coverage gaps in macro base station 124 coverage, e.g., indoors, in urban environments, etc. In some cases, a C-RAN 100A may be considered a type of small cell.

Even though a typical macro base station 124 is deployed in an operator's network, a C-RAN 100A is typically deployed in an operator's enterprise network. The term "enterprise" may refer to any site 102 (e.g., a building, campus, grouping of buildings) or some other public venue (such as a hotel, resort, amusement park, hospital, shopping center, airport, university campus, arena, or an outdoor area such as a ski area, stadium, or a densely-populated downtown area) or the entity that owns or operates the site 102 (for example, one or more businesses, governments, or other enterprise entities). The IT network (e.g., an ETHERNET network) in or implemented by an enterprise is referred to as an enterprise network.

A central controller (e.g., baseband controller 104) is typically not manufactured for a specific operator. Instead, it is compatible with multiple operators, but needs to communicate with a specific one. Accordingly, in order to provide coverage to the enterprise network, a central controller (e.g., baseband controller 104) in a C-RAN 100A needs to be configured to access the operator's network 126. The connection to the operator's network is through a secure connection, such as an Internet Protocol Security (IPSec) tunnel and/or another secure tunnel. In some configurations, there may be two or three tunnels set up between the C-RAN 100A and the operator's network 126 (instead of one), one for operations, administration, and management (OAM) information, one for a data bearer (e.g., to the core network 112), and optionally one for a certificate authority.

In order to access the operator's network 126 and begin operation, the central controller (e.g., baseband controller 104) may need at least some of the following information (some of which is operator-specific): details about how to connect to the management system 122, core network 112, and/or optional certificate authority (e.g., IP address and/or FQDN for the respective security gateways used to access each device); information about whether to access the core network 112 using a tunnel; information about a timing source (for the central controller to use for synchronization); a list of RUs 106 to allow during a discovery process; details about how to derive Internet Protocol (IP) addresses to assign to the RUs 106; a ROOT certificate (for various authentication purposes); a license file (for the specific features purchased by the operator); and/or whether to use an IPv4 or IPv6 addressing model.

To commission itself with this information, the central controller (e.g., baseband controller 104) may be factory-configured with information that enables it to communicate with an activation server 128, e.g., credentials necessary to access the activation server 128, an IP address (or fully qualified domain name (FQDN)), and/or a port number of the activation server 128 owned and operated by the manufacturer of the central controller. Upon being powered on and connected to the backhaul network 114, the central controller (e.g., baseband controller 104) may contact the activation server 128 at the pre-configured IP address (of FQDN) and port number, authenticate its credentials, and request a commissioning package that is specific to a particular operator and, optionally, the specific deployment details for the C-RAN 100A. The activation server 128 serves the commissioning package to the central controller (e.g., baseband controller 104), which configures itself accordingly. This commissioning can be done without any (or with little) user input at the central controller (e.g., baseband controller 104).

Example 5G C-RAN

Figure 1B:
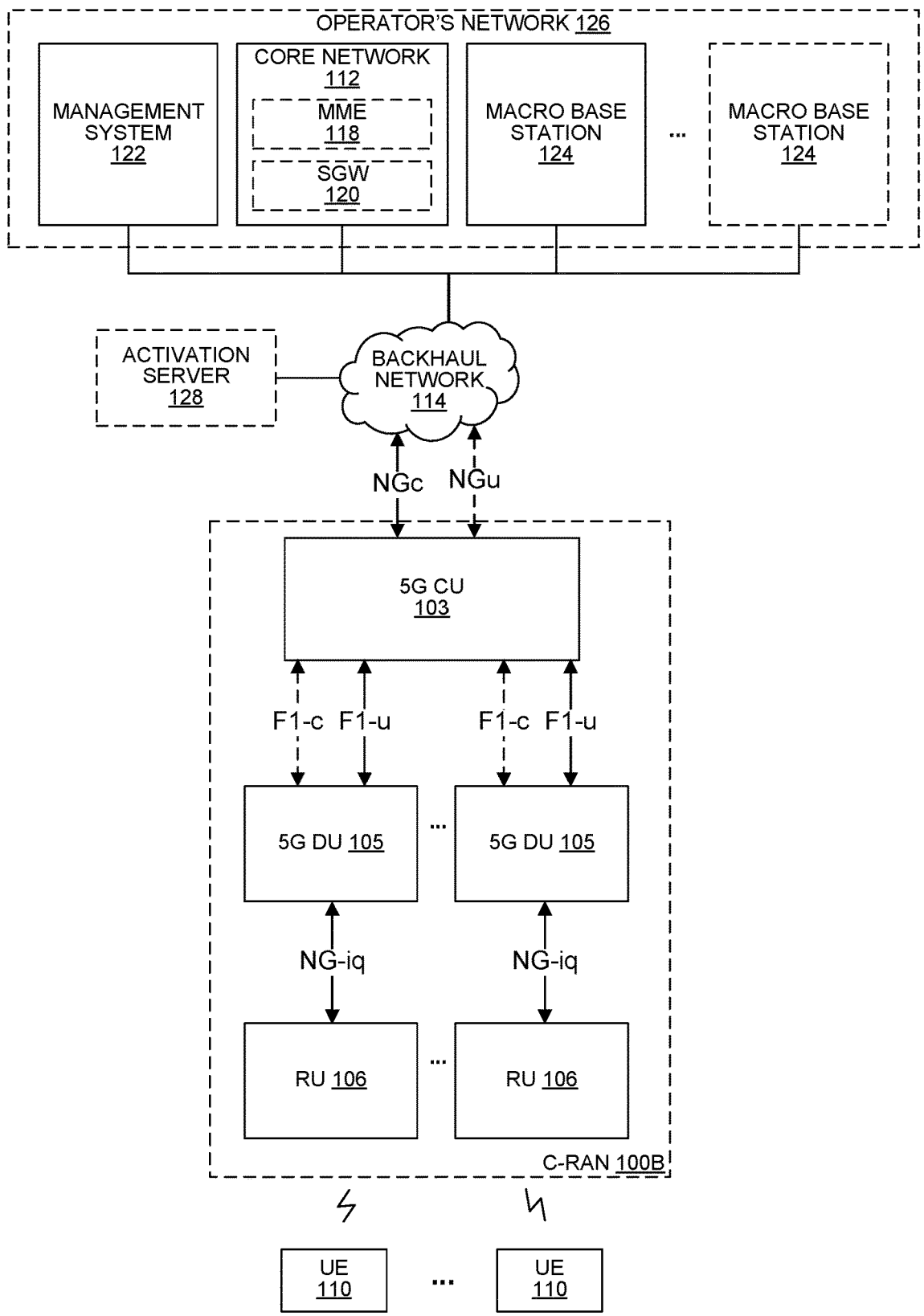
FIG. 1B is a block diagram illustrating another exemplary configuration of a system implementing data analysis and/or configuration of a C-RAN.

FIG. 1B is a block diagram illustrating another exemplary configuration of a system implementing data analysis and/or configuration of a C-RAN 100B. The C-RAN 100B includes 3GPP Fifth Generation (5G) elements. Optionally, the C-RAN 100B may additionally include 4G elements. Each of the elements may be implemented using at least one processor executing instructions stored in at least one memory. In some configurations, at least some of the elements are implemented using a virtual machine.

Fifth Generation (5G) standards support a wide variety of applications, bandwidth, and latencies while supporting various implementation options. In FIG. 1B, interfaces denoted with "-c" or simply "c" (illustrated with dashed lines) provide control plane connectivity, while interfaces denoted with "-u" or simply "u" (illustrated with solid lines) provide user plane connectivity.

FIG. 1B illustrates a C-RAN 100B implementing an example of a 5G Next Generation NodeB (gNB). The architecture of a Next Generation NodeB (gNB) is partitioned into a 5G Central Unit (CU) 103, one or more 5G Distributed Unit (DU) 105 and one or more 5G Remote units (RU) 106. A 5G Central Unit (CU) 103 is a node that implements the gNB controller functions such as the transfer of user data, mobility control, radio access network sharing, positioning, session management, etc. The 5G CU 103 controls the operation of the Distributed Units (DUs) 105 over an interface (including F1-c and F1-u for the control plane and user plane, respectively).

The Distributed Units (DUs) 105 may be nodes that implement a subset of the gNB functions, depending on the functional split (between CU 103 and DU 105). In some configurations, the L3 processing (of the 5G air interface) may be implemented in the CU 103 and the L2 processing (of the 5G air interface) may be implemented in the DU 105. The operation of each DU 105 is controlled by a CU 103. The functions of the DU 105 may include Radio Link Control (RLC), portions of Medium Access Control (MAC) and/or portions of the physical (PHY) layer functions. A Distributed Unit (DU) 105 can optionally offload some of its PHY (L1) processing (of the 5G air interface) to RUs 106.

In FIG. 1B, the C-RAN 100B includes a single CU 103, which handles control plane functions and user plane functions. The 5G CU 103 (in the C-RAN 100B) may communicate with at least one wireless service provider's Next Generation Cores (NGC) 112 using 5G NGc and 5G NGu interfaces. In some 5G configurations (not shown), a 5G CU 103 is split between a CU-C that handles control plane functions and a CU-U that handles user plane functions.

In some 5G configurations, the RUs (RUs) 106 may communicate baseband signal data to the DUs 105 on an NG-iq interface. In some 5G configurations, the RUs 106 may implement at least some of the L1 and/or L2 processing. In some configurations, the RUs 106 may have multiple ETHERNET ports and can communicate with one or more switches.

In 5G environments, the CU(s) 103 and DU(s) 105 are generally implemented as physical network functions (PNFs), however other configurations are possible where the CU(s) 103 and/or DU(s) 105 are implemented as virtual network functions (VNFs)).

Any of the interfaces in FIG. 1B may be implemented using a switched ETHERNET (or fiber) network. Additionally, if multiple CUs 103 are present (not shown), they may communicate with each other using any suitable interface, e.g., an Xn (Xn-c and Xn-u) and/or X2 interface. A fronthaul interface may facilitate any of the NG-iq, F1-c, and/or F1-u interfaces in FIG. 1B.

Where functionality of a baseband controller 104 is discussed herein, it may also apply to a 5G CU 103 or 5G DU 105 in 5G configurations. Therefore, where a C-RAN 100 is described herein, it may include 4G elements (as in FIG. 1A) and/or 5G elements (as in FIG. 1B).

A 5G CU 103 and/or a 5G DU 105 may be commissioned automatically by downloading a commissioning package from an activation server 128, as described herein.

Automatic Commissioning

Figure 2:
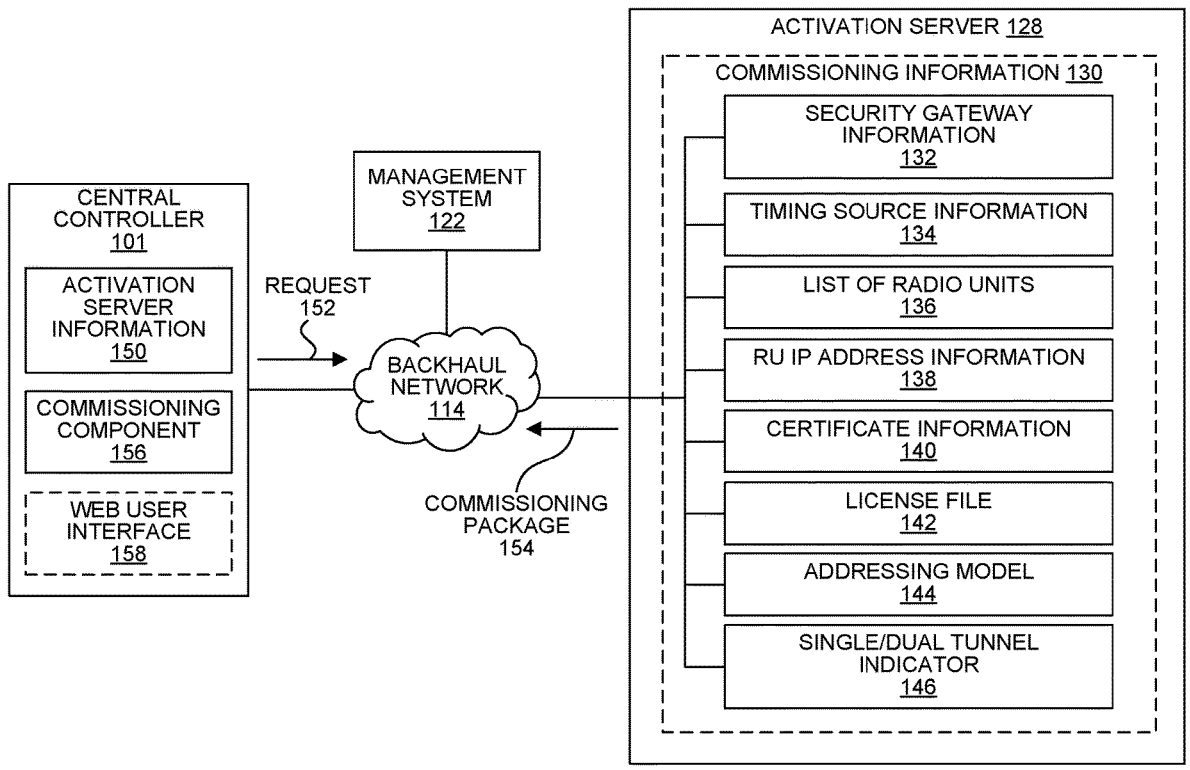
FIG. 2 is a block diagram illustrating example commissioning information a central controller downloads from an activation server.

FIG. 2 is a block diagram illustrating example commissioning information 130 a central controller 101 downloads from an activation server 128, e.g., via a backhaul network 114. It should be noted that the central controller 101 may download more, less, or a subset of the commissioning information 130 shown in FIG. 2.

The central controller 101 may be pre-configured with activation server information 150 holding commissioning information 130. For example, the activation server information 150 may include credentials (e.g., username and password) to access the activation server 128, and an IP address (or FQDN) and a port number of the activation server 128. Upon being powered up (and optionally connected to the backhaul network 114), the central controller 101 may send a request 152 to the activation server for commissioning information 130 specific to the operator and/or the location of the C-RAN 100 to which the central controller 101 belongs. In some configurations, a Dynamic Host Configuration Protocol (DHCP) server is also required to be accessible before the central controller 101 can contact the activation server 128. In response to the request 152, the activation server 128 may combine at least some of the commissioning information 130 into a commissioning package 154 that is downloaded to the central controller 101. The commissioning package 154 may be formatted and/or encrypted in any suitable way.

In examples, at least some of the automatic commissioning is performed by a commissioning component 156 in the central controller 101. A "component" may be a set of instructions that implements particular functionality when executed by a processor.

The commissioning package 154 may include different types of commissioning information 130. The security gateway information 132 may include information about security gateway(s) used by the central controller 101 to establish secure connection(s) (e.g., IPSec tunnel(s)) to the operator's management system 122, core network 112, and/ or certificate authority, e.g., IP address and/or FQDN details of each security gateway used to establish VPN connections via each security gateway. The secure connection to the operator's management system 122 (e.g., via a first security gateway) may carry operations, administration, and management (OAM) traffic between the central controller 101 and the management system 122. The secure connection to the core network 112 (e.g., via a second security gateway) may carry user data (e.g., LTE or 5G traffic) between the central controller 101 and the core network 112. The optional secure connection to the optional certificate authority (e.g., via a third security gateway) may information relating to certificates between the central controller 101 and the certificate authority. Alternatively, any of the first, second, and third security gateways may be combined, e.g., a single security gateway can be used to access the entire operator's network 126.

Furthermore, in some configurations, the central controller 101 may access the certificate authority without a security gateway. When the operator's network 126 uses a certificate authority, the details of how to access the certificate authority may also be included provided in the security gateway information 132. These details can include: (1) an IP Address and/or FQDN of the certificate authority; and/or (2) an indication as to whether the certificate authority could be directly accessed or whether it should be accessed through a security gateway. If the certificate authority is accessed through a security gateway, then details of the security gateway can be included in the security gateway information 132.

The timing source information 134 may include an indication of the reference clock to which the central controller 101 should synchronize. The reference clock may be a Global Positioning System (GPS) clock, a Network Time Protocol (NTP) server, or a Precision Time Protocol (PTP) server. In the case of an NTP server or PTP server, the timing source information 134 may include an IP address of the server. Once the central controller 101 is synchronized to the reference clock, the RUs 106 may be synchronized to the central controller 101.

The list of remote units 136 may indicate the RUs 106 that should be allowed to connect to the central controller 101, e.g., RU serial numbers and/or Medium Access Control (MAC) addresses. In some examples, the central controller 101 and the RUs 106 are shipped to the operator separately without pre-loading an association of the RUs 106 onto the central controller 101. Therefore, the list of remote units 136 may allow the central controller 101 to know which RUs 106 to connect and start a discovery process with.

The RU IP address information 138 may include details required to derive IP addresses for the RUs 106 that it serves. In some examples, the central controller 101 assigns IP addresses for each RU 106 during a discovery process between the central controller 101 and the respective RU 106. The RU IP address information 138 may include information that enables the central controller 101 to do that. For example, the central controller 101 may use subnet information in the RU IP address information 138 to derive the IP address for the RUs 106 that connect to it.

The certificate information 140 may include any ROOT certificate(s) used for various authentication purposes. ROOT certificate(s) are used to setup secure communication with network elements in the operator's network 126. Secure communications may be IPSec tunnel(s) with a Security Gateway, Transport Layer Security (TLS)/Secure Sockets Layer (SSL)/Hypertext Transfer Protocol Secure (HTTPS) connection with the OAM-Management System (e.g., management system 122), TLS/SSL/SSH File Transfer Protocol (SFTP) connection with log & image servers, etc.

The license file 142 may indicate the features (of the central controller 101) that the operator is licensed to use. The operator may license features from the manufacturer of the central controller 101 relating to parameters and/or techniques that may be used in a C-RAN 100 to increase performance, efficiency, etc.

The addressing model 144 may indicate whether the central controller 101 is to use IPv4 or IPv6 to communicate with the operator's network 126.

The single/dual tunnel indicator 146 may indicate whether the operator combines OAM traffic (e.g., to the management system 122) and user data traffic (e.g., LTE or 5G traffic) on the same tunnel (single tunnel mode) or uses separate tunnels for OAM traffic and user data traffic (dual tunnel mode). A tunnel may be thought of as a communication pathway between tunnel endpoints, e.g., an IPSec tunnel (also referred to as a Virtual Private Network (VPN)).

In addition, the commissioning package 154 may optionally include any of the following information: Simple Network Management Protocol (SNMP) server information in the enterprise network (for the central controller 101 to contact with alarms when things go wrong, such as network connectivity issues between the central controller 101 and RU 106, network connectivity issues between the central controller 101 and core network 112, IPSec tunnel failure, central controller 101 to management system 122 IPSec tunnel failure, central controller 101 and RU 106 timing failure, e.g., so that the enterprise network can be reconfigured); locations (e.g., latitude/longitude/altitude) of the central controller 101 and/or RUs 106.

In some configurations, the commissioning package 154 may also include a single/dual port indicator that indicates whether the central controller 101 should combine timing packets and traffic associated with a secure connection protocol on the same ETHERNET port or use different ETHERNET ports. For example, the single/dual port indicator may indicate whether PTP/NTP timing packets should be combined with IPSec packets on a single ETHERNET port or if dedicated ports should be used for each type of traffic.

In some configurations, the commissioning package 154 may also include authentication server information, such as an IP address or FQDN (e.g., where the authentication server implements a Lightweight Directory Access Protocol (LDAP) or Windows ActiveDirectory service) the central controller 101 can access for user authentication. For example, the central controller 101 may have a user interface for user management (to allow or remove users and assign credentials to the users to login to the central controller 101), but the enterprise may have an existing directory that the central controller 101 can access. This way, a user can use the same credentials they use for other systems in the enterprise network and the central controller 101 will check their credentials against the LDAP or ActiveDirectory service before allowing access to the central controller 101.

In some examples, the central controller 101 would automatically be commissioned via the activation server 128 by default, but may also implement a web user interface 158 that could be used to commission the central controller 101 instead of or in addition to the automatic process described herein. The web user interface 158 may include instructions on the central controller 101 (host) and/or a third party device (client), which communicate over the backhaul network 114. Therefore, when functionality of the web user interface 158 is described, it could be referring to instructions being executed (by a processor) at the central controller 101 and/or a third party device.

In some examples, future commissioning information (after initial commissioning) may be pushed to the central controller 101 from the management system 122 (e.g., OAM) instead of the activation server 128 once the central controller 101 can communicate with the operator's network 126. This would reduce on-site service calls for future commissioning of the central controller 101. For example, the central controller 101 could be commissioned remotely for a new feature that wasn't available at the time of manufacture of the central controller 101.

In some examples, fronthaul configuration information may also be sent to the central controller 101 during automatic commissioning. For example, parameters, settings, and/or profiles for switches in the fronthaul network 116 and/or RUs 106 may be sent to the central controller 101, where this fronthaul commissioning information is based on VLAN information, system bandwidth, and/or timing latency information of the fronthaul network 116. This would allow, without manual user intervention, the central controller 101 to configure the switches and/or RUs 106 as the switches and RUs 106 connect to the central controller 101 during the discovery process (between the RUs and the central controller 101).

Figure 3:
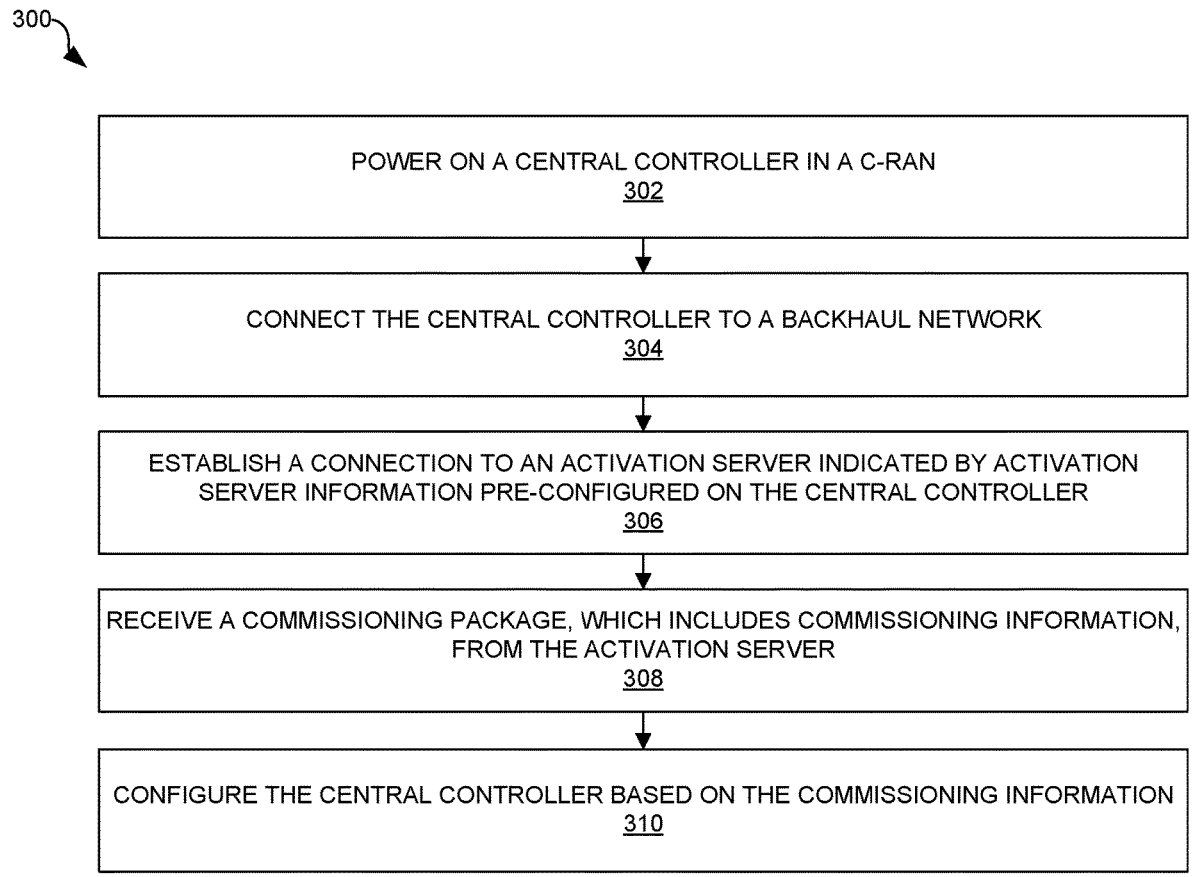
FIG. 3 is a flow diagram illustrating an exemplary method for commissioning a central controller in a C-RAN.

FIG. 3 is a flow diagram illustrating an exemplary method 300 for commissioning a central controller 101 in a C-RAN 100. The method 300 may be performed by, and optionally on behalf of a central controller 101 in a C-RAN 100. In some examples, the method 300 is performed before the central controller 101 is operational (e.g., before the C-RAN 100 is providing wireless service to UEs 110). The method 300 may be performed without being triggered by a technician (on-site or off-site), although an on-site technician may need to physically plug the central controller 101 into a power source, press a power button, and/or physically connect the central controller 101 to a backhaul network 114 (e.g., plugging in an ETHERNET cable into the central controller 101).

The blocks of the flow diagram shown in FIG. 3 have been arranged in a generally sequential manner for ease of explanation; however, it is to be understood that this arrangement is merely exemplary, and it should be recognized that the processing associated with method 300 (and the blocks shown in FIG. 3) can occur in a different order (for example, where at least some of the processing associated with the blocks is performed in parallel and/or in an event-driven manner). Also, most standard exception handling is not described for ease of explanation; however, it is to be understood that method 300 can and typically would include such exception handling.

The method 300 begins at step 302 where the central controller 101 is powered on. For example, this may be the first time the central controller 101 is powered on since it was shipped to an operator of a wireless network.

The method 300 proceeds at step 304 where the central controller 101 is connected to a backhaul network 114. Step 302 may include physically plugging in a network connection, e.g., an ETHERNET cable. In some examples, step 302 also includes the central controller 101 being assigned an IP address, a default gateway, and/or other network parameters from a Dynamic Host Configuration Protocol (DHCP) server.

The method 300 proceeds at step 306 where the central controller 101 establishes a connection to an activation server 128 indicated by activation server information 150 pre-configured on the central controller 101. The activation server information 150 may include credentials the central controller 101 can use to access an activation server 128 (e.g., username and password), an IP address (or fully qualified domain name (FQDN)) of the activation server 128, and/or a port number of the activation server 128.

Optionally, the central controller 101 checks a completion flag before establishing a connection to the activation server 128. The completion flag may be checked (e.g., at power up) to determine whether initial commissioning has been performed already. In some examples, when the completion flag is true, the remaining method 300 is not performed. When the completion flag is not true, the remainder of the method 300 is performed.

Optionally, the commissioning component 156 may download a checksum derived from the commissioning information 130 and/or the commissioning package 154 at the activation server 128. Then, the commissioning component 156 may compare the checksum against another checksum to determine whether to proceed. For example, the commissioning component 156 may verify that the checksum is different than a previous checksum (associated with commissioning information 130 previous downloaded from the activation server 128). In some examples, the commissioning component 156 proceeds to download the commissioning package only when the current checksum is different than the previous checksum stored at the commissioning component 156, which indicates that the commissioning information 130 on the activation server 128 is different than the configuration currently in use by the central controller 101.

The method 300 proceeds to step 308 where the central controller 101 receives a commissioning package 154, which includes the commissioning information 130, from the activation server 128. Optionally, the commissioning package 154 is received from the activation server 128 in response to the central controller 101 sending a request 152 for commissioning information 130 to the activation server 128. Optionally, the commissioning component 156 may also validate the checksum, the commissioning information 130, and/or the commissioning package 154 from the activation server 128.

The commissioning information 130 may include security gateway information 132 (e.g., IPSec tunnel information) for accessing the management system 122 security gateway, the core network 112 security gateway, and/or a certificate authority security gateway (where any two or three of these security gateways may be combined into a single security gateway); timing source information 134; a list of RU serial numbers and/or MAC addresses; RU IP address information 138; digital certificates; a license file 142 to operate; an addressing model 144 (IPv4 vs IPv6); and/or a single/dual tunnel indicator 146. Optionally, the commissioning information 130 may also include SNMP server information; locations (e.g., GPS coordinates) of the central controller 101 and/or RUs 106 in the C-RAN 100; information for an authentication server that implements a directory service (e.g., an LDAP or Windows ActiveDirectory service); and/or control traffic flow information (such as to whether or not PTP/NTP timing packets should be combined with IPSec packets into a single ETHERNET port). At least some of the commissioning information 130 may be specific to the location and/or deployment of the C-RAN 100. At least some of the commissioning information 130 may also be specific to the operator.

The method 300 may proceed at step 310 where the central controller 101 configures itself based on the commissioning information 130. This may include changing parameters, settings, and/or profiles to match the commissioning information 130.

Optionally, the commissioning component 156 sets a completion flag as true after step 310.

Optionally, the web user interface 158 may be blocked from updating the commissioning information 130 during the method 300 (e.g., after comparing or validating the checksum or validating the commissioning package 154), then re-enabled following completion of step 310.

It should be noted that the method 300 describes the initial commissioning of a central controller 101. During a commissioning update (sometime following the initial commissioning), an activation server 128 (or management system 122) may determine that new commissioning information 130 is available for the central controller 101 after which new/updated commissioning information 130 is downloaded from the activation server 128 (or management system 122).

In some configurations, the status of the method 300 is displayed at the central controller 101 (e.g., for the benefit of an on-site technician) or at a third party computing device via a web user interface 158. Therefore, corresponding updates may be sent to a web user interface 158 for display following any of the steps described above.

Figure 4:
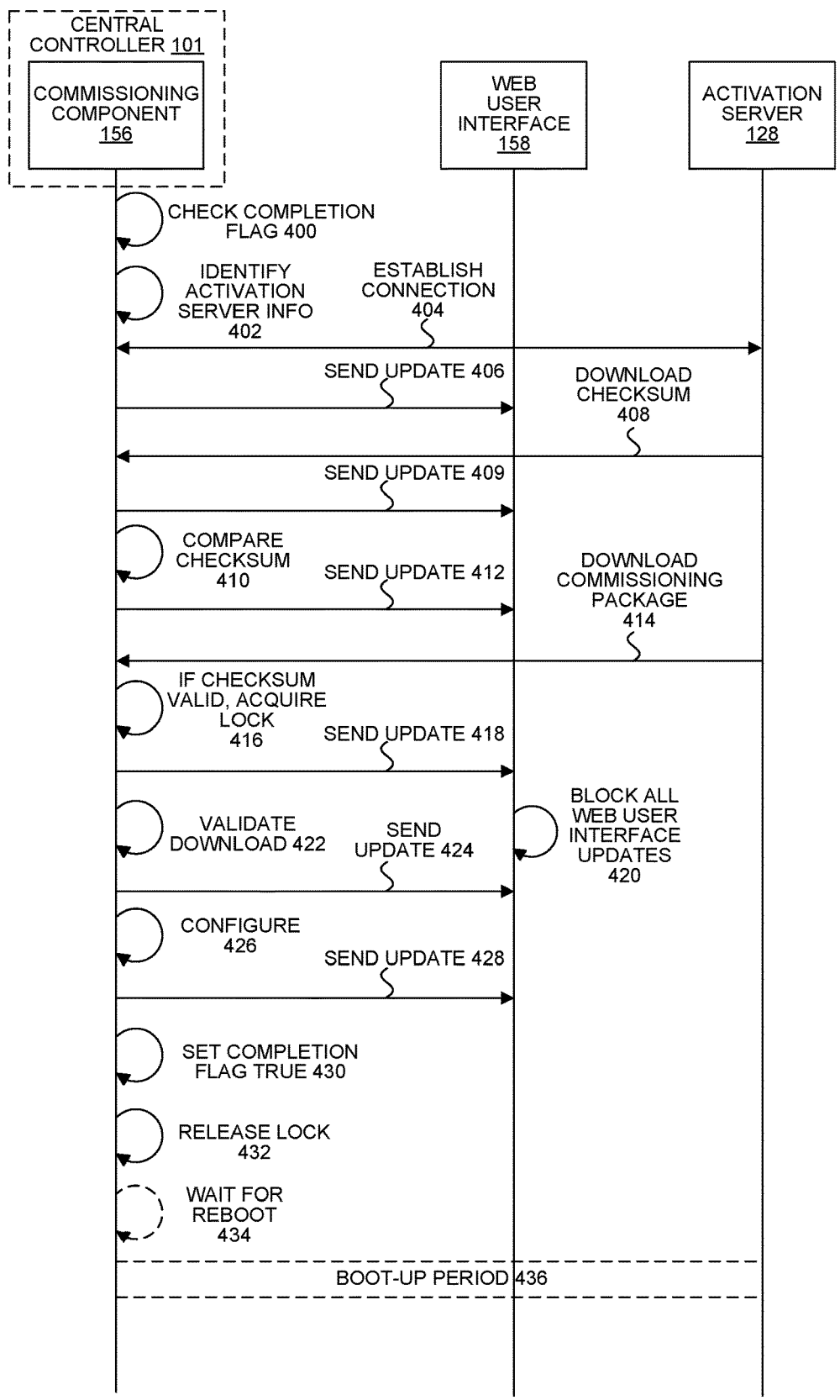
FIG. 4 is a sequence diagram illustrating exemplary signaling during automatic commissioning of a central controller in a C-RAN.

FIG. 4 is a sequence diagram illustrating exemplary signaling during automatic commissioning of a central controller 101 in a C-RAN 100. Specifically, FIG. 4 illustrates signaling between a commissioning component in the central controller 101, a web user interface 158, and an activation server 128 during automatic commissioning of the central controller 101 to communicate on a backhaul network 114.

At step 400, the commissioning component 156 checks a completion flag. In examples, the completion flag is checked (e.g., at power up) to determine whether initial commissioning has been performed already. When the completion flag is true, the remaining commissioning sequence illustrated in FIG. 4 is not performed. When the completion flag is not true, the commissioning sequence illustrated in FIG. 4 is performed.

In step 402, the commissioning component 156 identifies activation server information 150 that was pre-stored on the central controller 101 during manufacture. The activation server information 150 may include credentials the central controller 101 can use to access an activation server 128 (e.g., username and password, and optionally certificates or pre-shared keys), an IP address (or fully qualified domain name (FQDN)) of the activation server 128, and/or a port number of the activation server 128.

In step 404, the commissioning component 156 establishes a connection/session with the activation server 128 using the activation server information 150. This may include the commissioning component 156 connecting to the activation server 128 at the IP address or FQDN and port number of the activation server 128, then authenticating the username and password with the activation server 128. In some examples, the sequence proceeds only if the username and password pass authentication.

At step 406, the commissioning component 156 sends an update to the web user interface 158 to display an indication that a connection has been established with the activation server 128.

At step 408, the commissioning component 156 downloads a checksum of the commissioning information 130 and/or the commissioning package 154 from the activation server 128. A checksum is typically a string of characters deterministically derived from (and optionally used to detect errors in) input data. The checksum can be computed from the input data using a checksum function where a change to the input data will produce a different checksum.

At step 409, the commissioning component 156 sends an update to the web user interface 158 to display an indication that the checksum was downloaded from the activation server 128.

At step 410, the commissioning component 156 may verify that the checksum is different than a previous checksum (associated with commissioning information 130 previously downloaded from the activation server 128). If the checksum downloaded in step 408 was the first checksum downloaded from the activation server 128, the previous checksum may have some default value that will be different form the current checksum. In examples, the sequence proceeds only when the current checksum (downloaded in step 408) is different than the previous checksum stored at the commissioning component 156, which indicates that the commissioning information 130 on the activation server 128 is different than the configuration currently in use by the central controller 101.

At step 412, the commissioning component 156 sends an update to the web user interface 158 to display an indication that the checksum passed the comparison (that the current checksum is different than the previous checksum).

At step 414, the commissioning component 156 downloads a commissioning package 154 from the activation server 128. The commissioning package includes commissioning information for, among other things the central controller 101 to access the operator's network 126, as described above.

At step 416, the commissioning component 156 acquires a lock only if the checksum is validated. For the duration of the lock, the commissioning component 156 will not accept inputs from the web user interface 158 for the same information that it downloaded from the activation server 128 until the information received from the activation server 128 has been successfully verified and applied. In other words, the lock prevents concurrent data from being entered at the same time (via commissioning package from the activation server 128 and from the web user interface 158) to avoid ambiguity and errors.

Put another way, the web user interface 158 is locked out of write operations for the duration of the lock (the commissioning information cannot be changed via the web user interface 158 during the lock), although the web user interface 158 could still perform read operations, e.g., to generate web pages for the end user.

At step 418, the commissioning component 156 sends an update to the web user interface 158 to display an indication that a lock has been acquired.

At step 420, the web user interface 158 may disable all manual commissioning updates via the web user interface 158.

At step 422, the commissioning component 156 validates the commissioning information 130 in the commissioning package 154. This validation can include: (1) checking the format of the commissioning information 130 and/or the commissioning package 154; (2) checking to ensure that the value and ranges in the commissioning information 130 and/or the commissioning package 154 are within the supported range of values; (3) checking to ensure that the ROOT certificates and license file(s) 142 in the commissioning information 130 are complete and intact to prevent possible issues when trying to use them. Therefore, the validation in step 422 ensures that the commissioning information 130 in the downloaded commissioning package 154 is usable before applying the data.

At step 424, the commissioning component 156 sends an update to the web user interface 158 to display an indication that the commissioning information 130 has been validated.

At step 426, the commissioning component 156 configures the central controller 101 based on the commissioning information 130. This may include changing parameters, settings, and/or profiles to match the commissioning information 130.

At step 428, the commissioning component 156 sends an update to the web user interface 158 to display an indication that the central controller 101 has been configured.

At step 430, the commissioning component 156 sets a completion flag to true. When the completion flag is true, the commissioning sequence illustrated in FIG. 4 is not performed during subsequent powering up of the central controller 101.

At step 432, the commissioning component 156 releases the lock (from step 416). In some configurations, step 432 may include changing the web user interface 158 to a management mode where the web user interface 158 is once again able to write commissioning information 130 to the central controller 101.

At optional step 434, the commissioning component 156 waits for a reboot command.

At step 436, the central controller 101 is rebooted or factory reset during a boot-up period. In some configurations, the central controller 101 is rebooted automatically without manual input. Reboot is optionally required to apply the commissioning information 130. Some of the commissioning information 130, such as use of IPv4 vs IPv6, dual IPSec tunnel vs single IPSec tunnel for OAM and S1 (bearer) traffic, may require a reboot of the central controller 101. However, in some configurations, step 436 is optional, e.g., the commissioning information 130 could be applied even without a reboot.

The blocks of the sequence diagram shown in FIG. 4 have been arranged in a generally sequential manner for ease of explanation; however, it is to be understood that this arrangement is merely exemplary, and it should be recognized that the processing associated with sequence shown in FIG. 4 can occur in a different order (for example, where at least some of the steps are performed in parallel and/or in an event-driven manner). Also, standard exception handling is not described for ease of explanation; however, it is to be understood that such exception handling can and typically would be used.

It should be noted that any of the steps in FIG. 4 might not be performed in a particular implementation of the automatic commissioning described herein. For example, some or all of the various comparison, validation, updating, completion flag, and/or lock-related steps may be skipped during the commissioning.

Figure 5:
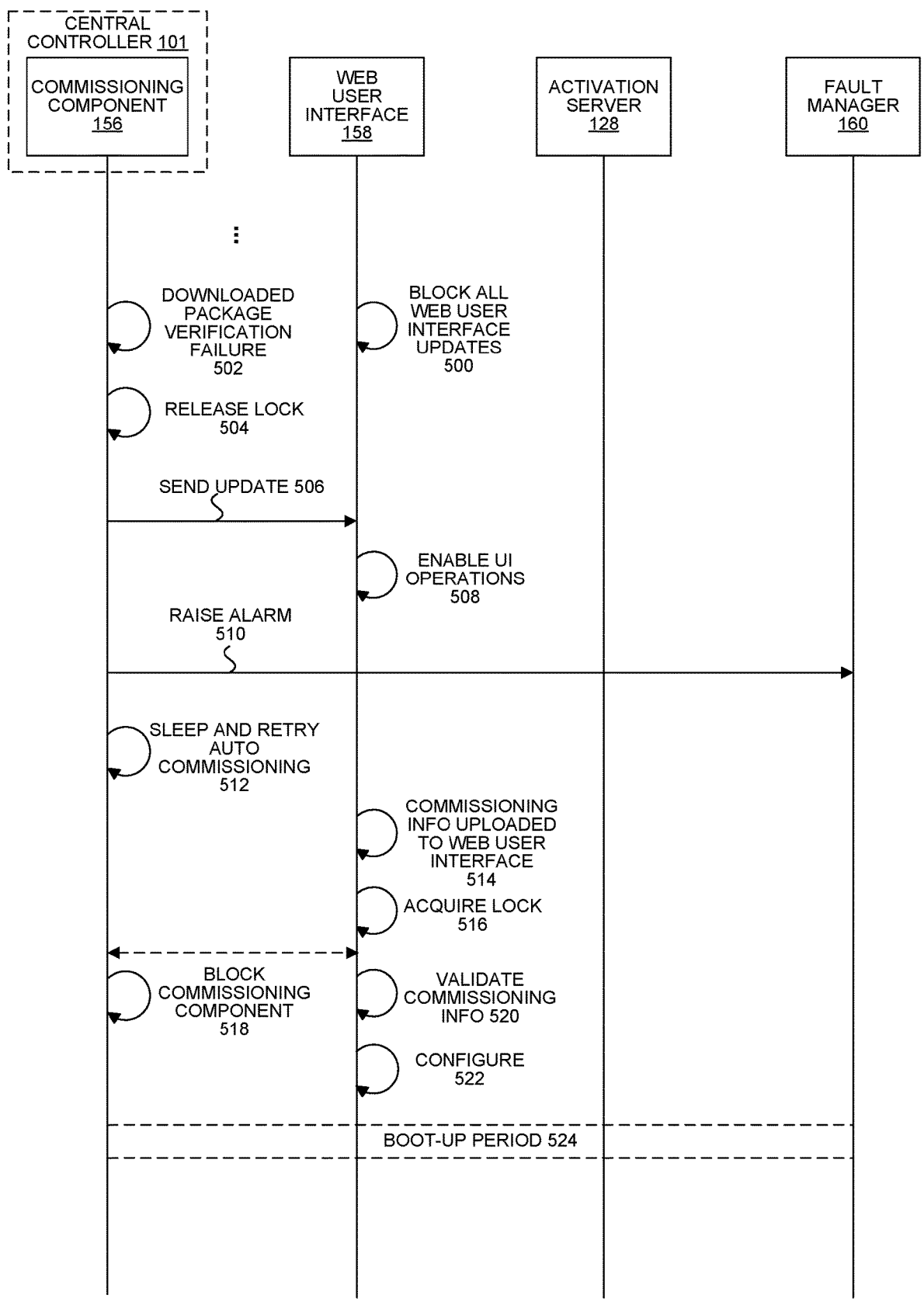
FIG. 5 is another sequence diagram illustrating exemplary signaling during automatic commissioning of a central controller in a C-RAN.

FIG. 5 is another sequence diagram illustrating exemplary signaling during automatic commissioning of a central controller 101 in a C-RAN 100. Specifically, FIG. 5 illustrates signaling between a commissioning component in the central controller 101, a web user interface 158, an activation server 128, and a fault manager 160 when the attempted validation of the commissioning package (in step 422 of FIG. 4) fails. Therefore, steps 400-420 may be performed before the sequence of FIG. 5. The fault manager 160 may be implementing with a set of instructions executing on at least one processor, e.g., on the central controller 101 or a separate device.

At step 500, the web user interface 158 may disable all manual commissioning updates via the web user interface 158.

At step 502, verification of the commissioning package 154 (downloaded in step 414 of FIG. 4) fails.

At step 504, the web user interface 158 releases the previous lock (from step 416 in FIG. 4).

At step 506, the commissioning component 156 sends an update to the web user interface 158 to display an indication that verification of the commissioning information 130 has failed.

At step 508, the web user interface 158 enables user interface operations (because the automatic commissioning has failed).

At step 510, the commissioning component 156 raises an alarm to the fault manager 160 indicating that the automatic commissioning has failed.

At step 512, the commissioning component 156 may sleep (e.g., for 5 minutes) and retry automatic commissioning. If one of the subsequent attempts succeeds, the remainder of the sequence of FIG. 5 may not be performed. Assume, however, that none of the automatic commissioning retries succeeds.

At step 514, commissioning information 130 is uploaded to the web user interface 158. This could include an on-site or remote technician uploading commissioning information 130 for the central controller 101.

At step 516, the web user interface 158 acquires a lock.

At step 518, the commissioning component 156 is blocked from attempting automatic commissioning.

At step 520, the commissioning information 130 and/or commissioning package 154 is validated, e.g., as described in step 422 in FIG. 4.

At step 522, the commissioning component 156 configures the central controller 101 based on the commissioning information 130. This may include changing parameters, settings, and/or profiles to match the commissioning information 130.

At step 524, the central controller 101 is rebooted during a boot-up period.

The blocks of the sequence diagram shown in FIG. 5 have been arranged in a generally sequential manner for ease of explanation; however, it is to be understood that this arrangement is merely exemplary, and it should be recognized that the processing associated with sequence shown in FIG. 5 can occur in a different order (for example, where at least some of the steps are performed in parallel and/or in an event-driven manner). Also, standard exception handling is not described for ease of explanation; however, it is to be understood that such exception handling can and typically would be used.

It should be noted that any of the steps in FIG. 5 might not be performed in a particular implementation of the automatic commissioning described herein. For example, some or all of the various validation, updating, and/or lock-related steps may be skipped during the commissioning.

Figure 6:
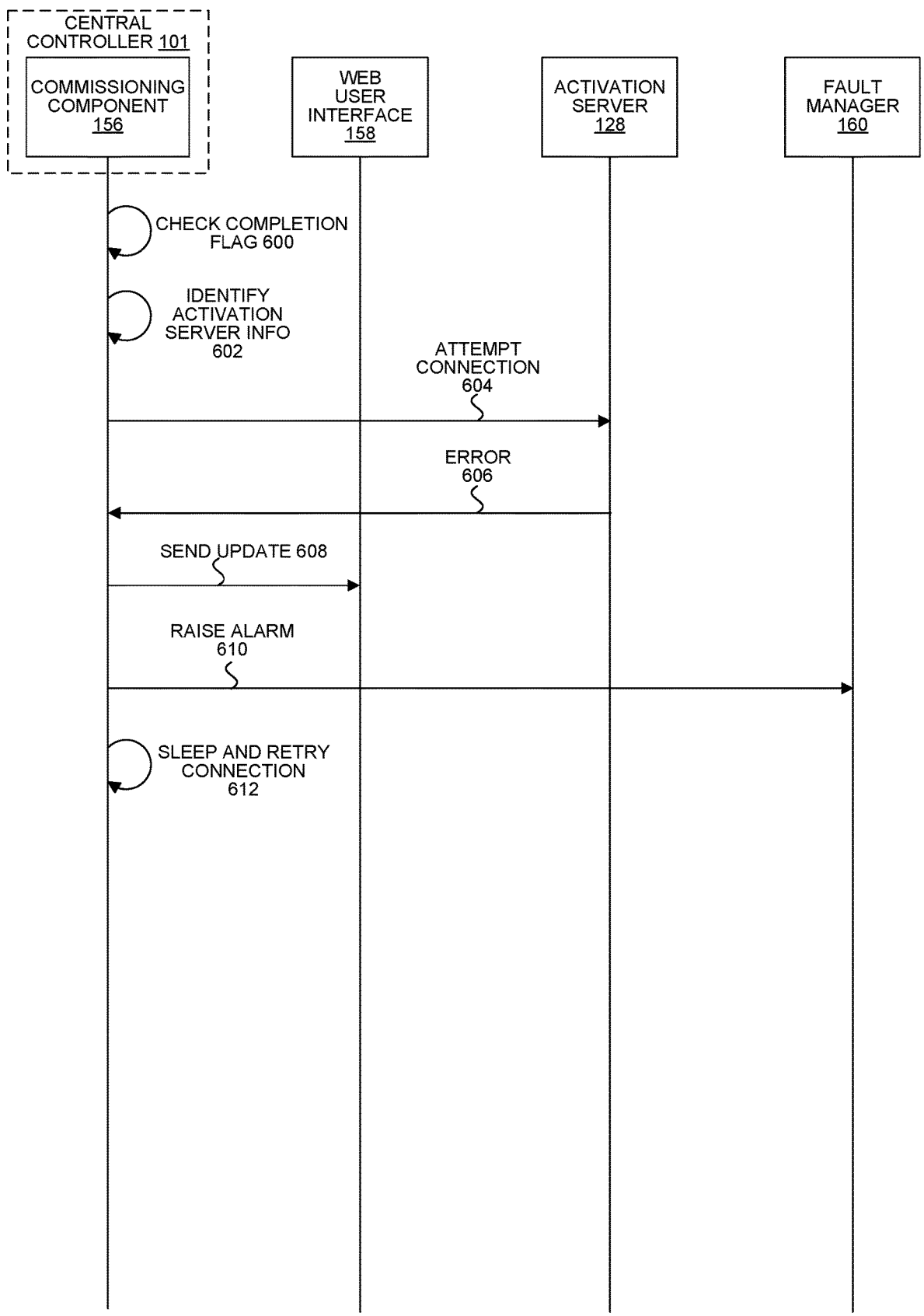
FIG. 6 is another sequence diagram illustrating exemplary signaling during automatic commissioning of a central controller in a C-RAN.

FIG. 6 is another sequence diagram illustrating exemplary signaling during automatic commissioning of a central controller 101 in a C-RAN 100. Specifically, FIG. 6 illustrates signaling between a commissioning component in the central controller 101, a web user interface 158, an activation server 128, and a fault manager 160 when the commissioning component is unable to establish a connection to the activation server 128.

At step 600, the commissioning component 156 checks a completion flag. In examples, the completion flag is checked (e.g., at power up) to determine whether initial commissioning has been performed already. When the completion flag is true, the remaining commissioning sequence illustrated in FIG. 6 is not performed. When the completion flag is not true, the commissioning sequence illustrated in FIG. 6 is performed.

In step 602, the commissioning component 156 identifies activation server information 150 that was pre-stored on the central controller 101 during manufacture. The activation server information 150 may include credentials the central controller 101 can use to access an activation server 128 (e.g., username and password), an IP address (or fully qualified domain name (FQDN)) of the activation server 128, and/or a port number of the activation server 128.

In step 604, the commissioning component 156 attempts to establish a connection/session with the activation server 128 using the activation server information 150. This may include the commissioning component 156 trying to connect to the activation server 128 at the IP address or FQDN and port number of the activation server 128, then authenticating the username and password with the activation server 128. In some examples, the sequence proceeds only if the username and password pass authentication.

In step 606, the commissioning component 156 receives an error message in response to the connection attempt (in step 604) failing. The error may indicate the reason for failure, e.g., activation server 128 not reachable, timeout encountered, authentication failure, etc.

At step 608, the commissioning component 156 sends an update to the web user interface 158 to display an indication that the commissioning component 156 cannot connect to the activation server 128.

At step 610, the commissioning component 156 raises an alarm to the fault manager 160 indicating that the connection failed.

At step 612, the commissioning component 156 may sleep (e.g., for 5 minutes) and retry connecting to the activation server 128. If one of the subsequent attempts succeeds, the remainder of the automatic commissioning may be performed.

The blocks of the sequence diagram shown in FIG. 6 have been arranged in a generally sequential manner for ease of explanation; however, it is to be understood that this arrangement is merely exemplary, and it should be recognized that the processing associated with sequence shown in FIG. 6 can occur in a different order (for example, where at least some of the steps are performed in parallel and/or in an event-driven manner). Also, standard exception handling is not described for ease of explanation; however, it is to be understood that such exception handling can and typically would be used.

It should be noted that any of the steps in FIG. 6 might not be performed in a particular implementation of the automatic commissioning described herein. For example, some or all of the various validation, updating, and/or lock-related steps may be skipped during the commissioning.

Figure 7:
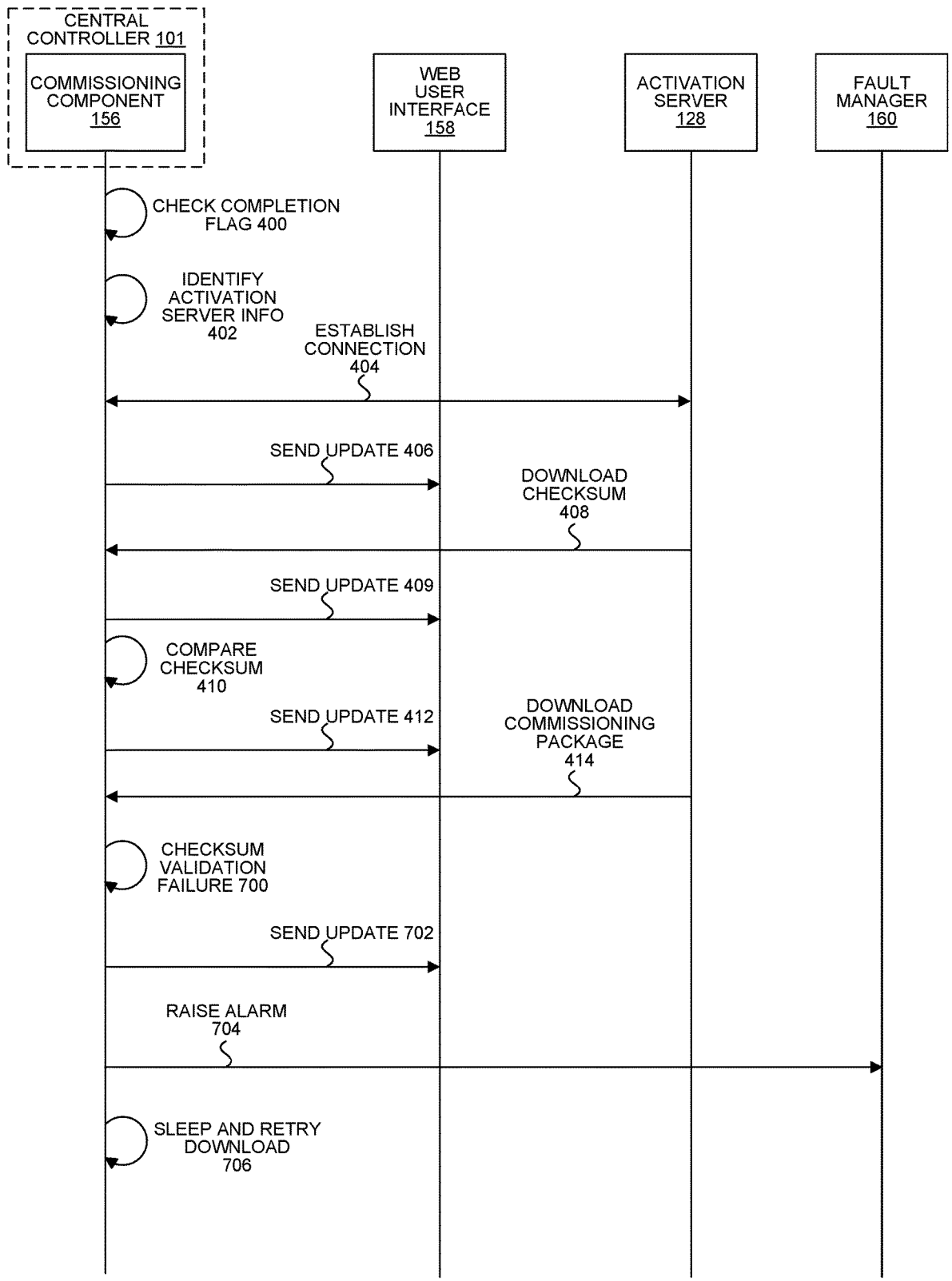
FIG. 7 is another sequence diagram illustrating exemplary signaling during automatic commissioning of a central controller in a C-RAN.

FIG. 7 is another sequence diagram illustrating exemplary signaling during automatic commissioning of a central controller 101 in a C-RAN 100. Specifically, FIG. 7 illustrates signaling between a commissioning component in the central controller 101, a web user interface 158, an activation server 128, and a fault manager 160 when there is a checksum mismatch. The sequence of FIG. 7 may be performed following attempted checksum validation (in step 416 of FIG. 4) fails. Therefore, steps 400-414 may be performed at the beginning of the sequence of FIG. 7.

At step 700, the commissioning component 156 cannot successfully validate the checksum (downloaded in step 408).

At step 702, the commissioning component 156 sends an update to the web user interface 158 to display an indication that the checksum cannot be validated.

At step 704, the commissioning component 156 raises an alarm to the fault manager 160 indicating that the connection failed.

At step 706, the commissioning component 156 may sleep (e.g., for 5 minutes) and retry downloading the checksum and/or the commissioning package 154. If the checksum then validates, the remainder of the automatic commissioning may be performed.

The blocks of the sequence diagram shown in FIG. 7 have been arranged in a generally sequential manner for ease of explanation; however, it is to be understood that this arrangement is merely exemplary, and it should be recognized that the processing associated with sequence shown in FIG. 7 can occur in a different order (for example, where at least some of the steps are performed in parallel and/or in an event-driven manner). Also, standard exception handling is not described for ease of explanation; however, it is to be understood that such exception handling can and typically would be used.

It should be noted that any of the steps in FIG. 7 might not be performed in a particular implementation of the automatic commissioning described herein. For example, some or all of the various validation, updating, and/or lock-related steps may be skipped during the commissioning.

Figure 8:
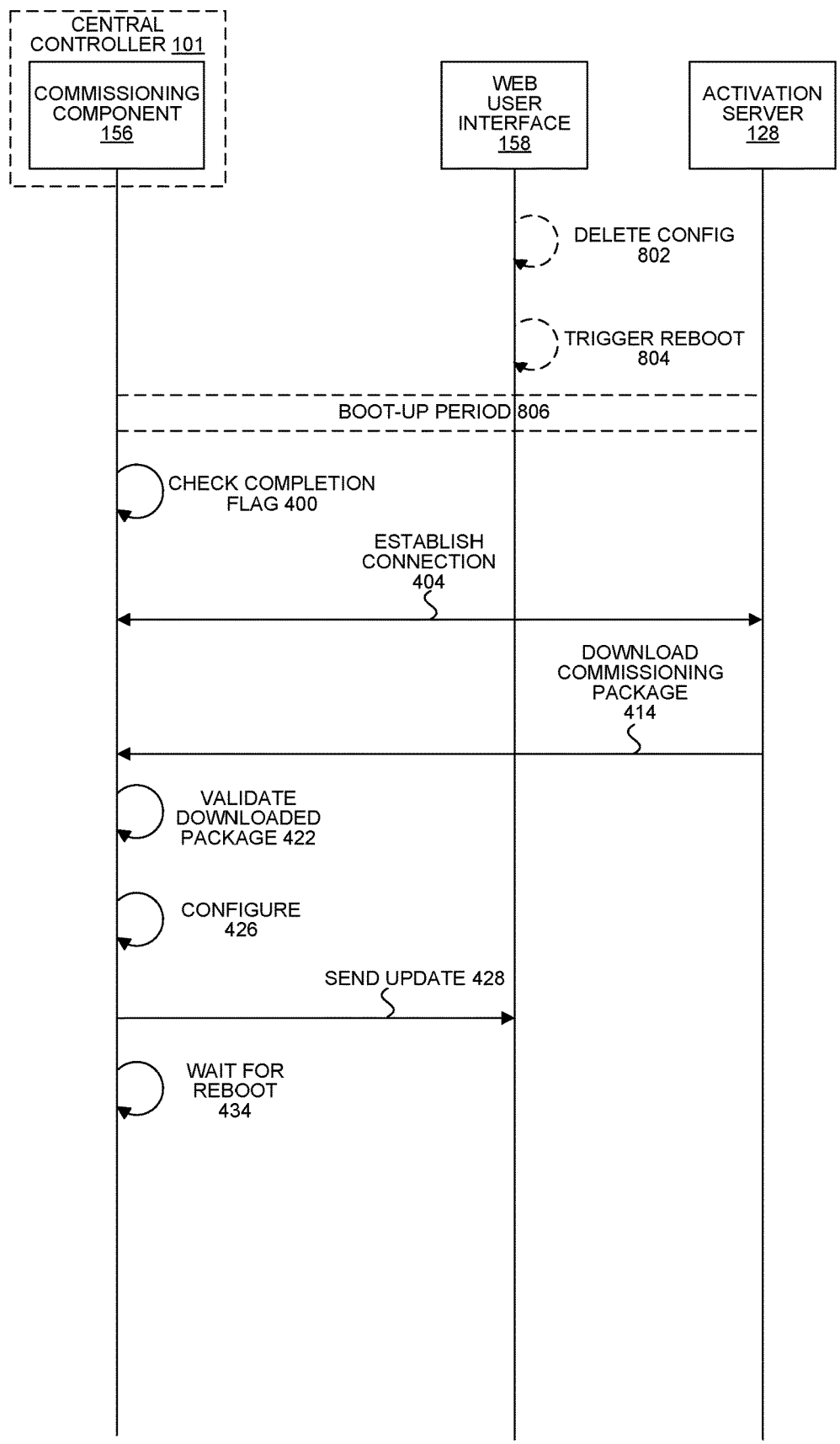
FIG. 8 is another sequence diagram illustrating exemplary signaling during automatic commissioning of a central controller in a C-RAN.

FIG. 8 is another sequence diagram illustrating exemplary signaling during automatic commissioning of a central controller 101 in a C-RAN 100. Specifically, FIG. 8 illustrates signaling between a commissioning component in the central controller 101, a web user interface 158, and an activation server 128 when the web user interface 158 triggers automatic commissioning of the central controller 101, e.g., to reset the existing configuration of commissioning information 130 on the central controller 101.

At step 802, the web user interface 158 deletes the existing configuration of commissioning information 130 on the central controller 101.

At optional step 804, the web user interface 158 triggers a reboot of the central controller 101.

At optional step 806, the central controller 101 is rebooted or factory reset during a boot-up period.

After boot-up, the commissioning component 156 performs at least steps 400, 404, 414, 422, 426, 428, and 434 from FIG. 4. Optionally, any of steps 402, 406-412, 416-420, 424, and/or 420-432.

The blocks of the sequence diagram shown in FIG. 8 have been arranged in a generally sequential manner for ease of explanation; however, it is to be understood that this arrangement is merely exemplary, and it should be recognized that the processing associated with sequence shown in FIG. 8 can occur in a different order (for example, where at least some of the steps are performed in parallel and/or in an event-driven manner). Also, standard exception handling is not described for ease of explanation; however, it is to be understood that such exception handling can and typically would be used.

It should be noted that any of the steps in FIG. 8 might not be performed in a particular implementation of the automatic commissioning described herein.

In conclusion, the present disclosure provides novel systems, methods, and arrangements for commissioning a central controller in a C-RAN. While detailed descriptions of one or more configurations of the disclosure have been given above, various alternatives, modifications, and equivalents will be apparent to those skilled in the art without varying from the spirit of the disclosure. For example, while the configurations described above refer to particular features, functions, procedures, components, elements, and/or structures, the scope of this disclosure also includes configurations having different combinations of features, functions, procedures, components, elements, and/or structures, and configurations that do not include all of the described features, functions, procedures, components, elements, and/or structures. Accordingly, the scope of the present disclosure is intended to embrace all such alternatives, modifications, and variations as fall within the scope of the claims, together with all equivalents thereof. Therefore, the above description should not be taken as limiting.

The term "and/or" means "and" or "or". For example, "A and/or B" can mean "A", "B", or "A and B". Additionally, "A, B, and/or C" can mean "A alone," "B alone," "C alone," "A and B," "A and C," "B and C" or "A, B, and C."

Example Embodiments

Example 1 includes a cloud radio access network (C-RAN), comprising: a plurality of remote units (RUs), each configured to exchange radio frequency (RF) signals with at least one user equipment (UE); and a central controller communicatively coupled to the plurality of RUs via a fronthaul network comprising one or more ETHERNET switches, wherein the central controller is communicatively coupled to an activation server via a backhaul network; wherein at least one processor is located in the central controller, wherein the at least one processor is configured to: following initial power up, establish a connection to the activation server indicated by activation server information pre-configured on the central controller; receive a commissioning package, which includes commissioning information, from the activation server; and configure the central controller based on the commissioning information.

Example 2 includes the C-RAN of Example 1, wherein the central controller is a Third Generation Partnership Project Fifth Generation (5G) Central Unit (CU) or Distributed Unit (DU), wherein the C-RAN implements a 5G air interface to communicate with the plurality of RUs.

Example 3 includes the C-RAN of any of Examples 1-2, wherein the central controller is a baseband controller, wherein the C-RAN implements a Third Generation Partnership Project Long Term Evolution air interface to communicate with the plurality of RUs.

Example 4 includes the C-RAN of any of Examples 1-3, wherein the activation server information comprises any of the following: a username and a password for the central controller to use when accessing the activation server; an Internet Protocol (IP) address or fully qualified domain name (FQDN) of the activation server; and a port number of the activation server.

Example 5 includes the C-RAN of any of Examples 1-4, wherein the commissioning information comprises information about at least one security gateway that is used by the central controller to securely connect to an operator's network.

Example 6 includes the C-RAN of any of Examples 1-5, wherein the commissioning information comprises information about an IP Security (IPSec) tunnel to be used for data bearer traffic.

Example 7 includes the C-RAN of any of Examples 1-6, wherein the commissioning information comprises an indication of a reference clock to which the central controller should synchronize.

Example 8 includes the C-RAN of any of Examples 1-7, wherein the commissioning information comprises a list of the RUs that the central controller should allow to connect during a discovery process.

Example 9 includes the C-RAN of any of Examples 1-8, wherein the commissioning information comprises information used by the central controller to derive IP addresses to assign to the RUs.

Example 10 includes the C-RAN of any of Examples 1-9, wherein the commissioning information comprises at least one ROOT certificate for the central controller to use when setting up at least one secure connection with an operator's network.

Example 11 includes the C-RAN of any of Examples 1-10, wherein the commissioning information comprises a license file indicating at least one feature that has been licensed for use in the central controller.

Example 12 includes the C-RAN of any of Examples 1-11, wherein the commissioning information comprises an indication of an addressing model to use when communicating with an operator's network.

Example 13 includes the C-RAN of Example 12, wherein the addressing model indicates Internet Protocol version 4 (IPv4) or Internet Protocol version 6 (IPv6).

Example 14 includes the C-RAN of any of Examples 1-13, wherein the commissioning information comprises a single/dual tunnel indicator that indicates whether an operator of the central controller combines operations, administration, and management (OAM) traffic on a same tunnel as user data traffic.

Example 15 includes the C-RAN of any of Examples 1-14, wherein the commissioning information comprises Simple Network Management Protocol (SNMP) server information in an operator's enterprise network for the central controller to contact with alarms in response to failures.

Example 16 includes the C-RAN of any of Examples 1-15, wherein the commissioning information comprises Global Positioning System (GPS) coordinates of the central controller and the RUs.

Example 17 includes the C-RAN of any of Examples 1-16, wherein the commissioning information comprises control traffic flow information indicating whether or not the central controller should combine timing packets and IPSec packets into a single ETHERNET port.

Example 18 includes the C-RAN of any of Examples 1-17, wherein the commissioning information comprises information for an authentication server that implements a directory service the central controller can access for user authentication. Example 19 includes a method performed by at least one processor in a central controller in a cloud radio access network (C-RAN), the method comprising: following initial power up, establish a connection to an activation server indicated by activation server information pre-configured on the central controller; receive a commissioning package, which includes commissioning information, from the activation server; and configure the central controller based on the commissioning information.

Example 20 includes the method of Example 19, wherein the central controller is a Third Generation Partnership Project Fifth Generation (5G) Central Unit (CU) or Distributed Unit (DU), wherein the C-RAN implements a 5G air interface to communicate with a plurality of RUs.

Example 21 includes the method of any of Examples 19-20, wherein the central controller is a baseband controller, wherein the C-RAN implements a Third Generation Partnership Project Long Term Evolution air interface to communicate with a plurality of RUs.

Example 22 includes the method of any of Examples 19-21, wherein the activation server information comprises any of the following: a username and a password for the central controller to use when accessing the activation server; an Internet Protocol (IP) address or fully qualified domain name (FQDN) of the activation server; and a port number of the activation server.

Example 23 includes the method of any of Examples 19-22, wherein the commissioning information comprises information about at least one security gateway that is used by the central controller to securely connect to an operator's network.

Example 24 includes the method of any of Examples 19-23, wherein the commissioning information comprises information about an IP Security (IPSec) tunnel to be used for data bearer traffic.

Example 25 includes the method of any of Examples 19-24, wherein the commissioning information comprises an indication of a reference clock to which the central controller should synchronize.

Example 26 includes the method of any of Examples 19-25, wherein the commissioning information comprises a list of remote units (RUs), which are communicatively coupled to the central controller and that the central controller should allow to connect during a discovery process.

Example 27 includes the method of any of Examples 19-26, wherein the commissioning information comprises information used by the central controller to derive IP addresses to assign to a plurality of RUs to which the central controller is communicatively coupled via a fronthaul network.

Example 28 includes the method of any of Examples 19-27, wherein the commissioning information comprises at least one ROOT certificate for the central controller to use when setting up at least one secure connection with an operator's network.

Example 29 includes the method of any of Examples 19-28, wherein the commissioning information comprises a license file indicating at least one feature that has been licensed for use in the central controller.

Example 30 includes the method of any of Examples 19-29, wherein the commissioning information comprises an indication of an addressing model to use when communicating with an operator's network.

Example 31 includes the method of Example 30, wherein the addressing model indicates Internet Protocol version 4 (IPv4) or Internet Protocol version 6 (IPv6).

Example 32 includes the method of any of Examples 19-31, wherein the commissioning information comprises a single/dual tunnel indicator that indicates whether an operator of the central controller combines operations, administration, and management (OAM) traffic on a same tunnel as user data traffic.

Example 33 includes the method of any of Examples 19-32, wherein the commissioning information comprises Simple Network Management Protocol (SNMP) server information in an operator's enterprise network for the central controller to contact with alarms in response to failures.

Example 34 includes the method of any of Examples 19-33, wherein the commissioning information comprises Global Positioning System (GPS) coordinates of the central controller and a plurality of RUs to which the central controller is communicatively coupled via a fronthaul network.

Example 35 includes the method of any of Examples 19-34, wherein the commissioning information comprises control traffic flow information indicating whether or not the central controller should combine timing packets and IPSec packets into a single ETHERNET port.

Example 36 includes the method of any of Examples 19-35, wherein the commissioning information comprises information for an authentication server that implements a directory service the central controller can access for user authentication.

The invention claimed is:

1. A cloud radio access network (C-RAN), comprising:
a plurality of remote units (RUs), each configured to exchange radio frequency (RF) signals with at least one user equipment (UE); and
a central controller communicatively coupled to the plurality of RUs via a fronthaul network comprising one or more ETHERNET switches, wherein the central controller is communicatively coupled to an activation server via a backhaul network;
wherein at least one processor is located in the central controller, wherein the at least one processor is configured to:
following initial power up, establish a connection to the activation server indicated by activation server information pre-configured on the central controller;
receive a commissioning package, which includes commissioning information, from the activation server; and
configure the central controller based on the commissioning information.

2. The C-RAN of claim 1, wherein the central controller is a Third Generation Partnership Project Fifth Generation (5G) Central Unit (CU) or Distributed Unit (DU), wherein the C-RAN implements a 5G air interface to communicate with the plurality of RUs.

3. The C-RAN of claim 1, wherein the central controller is a baseband controller, wherein the C-RAN implements a Third Generation Partnership Project Long Term Evolution air interface to communicate with the plurality of RUs.

4. The C-RAN of claim 1, wherein the activation server information comprises any of the following:
a username and a password for the central controller to use when accessing the activation server;
an Internet Protocol (IP) address or fully qualified domain name (FQDN) of the activation server; and
a port number of the activation server.

5. The C-RAN of claim 1, wherein the commissioning information comprises information about at least one security gateway that is used by the central controller to securely connect to an operator's network.

6. The C-RAN of claim 1, wherein the commissioning information comprises information about an IP Security (IPSec) tunnel to be used for data bearer traffic.

7. The C-RAN of claim 1, wherein the commissioning information comprises an indication of a reference clock to which the central controller should synchronize.

8. The C-RAN of claim 1, wherein the commissioning information comprises a list of the RUs that the central controller should allow to connect during a discovery process.

9. The C-RAN of claim 1, wherein the commissioning information comprises information used by the central controller to derive IP addresses to assign to the RUs.

10. The C-RAN of claim 1, wherein the commissioning information comprises at least one ROOT certificate for the central controller to use when setting up at least one secure connection with an operator's network.

11. The C-RAN of claim 1, wherein the commissioning information comprises a license file indicating at least one feature that has been licensed for use in the central controller.

12. The C-RAN of claim 1, wherein the commissioning information comprises an indication of an addressing model to use when communicating with an operator's network.

13. The C-RAN of claim 12, wherein the addressing model indicates Internet Protocol version 4 (IPv4) or Internet Protocol version 6 (IPv6).

14. The C-RAN of claim 1, wherein the commissioning information comprises a single/dual tunnel indicator that indicates whether an operator of the central controller combines operations, administration, and management (OAM) traffic on a same tunnel as user data traffic.

15. The C-RAN of claim 1, wherein the commissioning information comprises Simple Network Management Protocol (SNMP) server information in an operator's enterprise network for the central controller to contact with alarms in response to failures.

16. The C-RAN of claim 1, wherein the commissioning information comprises Global Positioning System (GPS) coordinates of the central controller and the RUs.

17. The C-RAN of claim 1, wherein the commissioning information comprises control traffic flow information indicating whether or not the central controller should combine timing packets and IPSec packets into a single ETHERNET port.

18. The C-RAN of claim 1, wherein the commissioning information comprises information for an authentication server that implements a directory service the central controller can access for user authentication.

19. A method performed by at least one processor in a central controller in a cloud radio access network (C-RAN), the method comprising:
following initial power up, establish a connection to an activation server indicated by activation server information pre-configured on the central controller;
receive a commissioning package, which includes commissioning information, from the activation server; and
configure the central controller based on the commissioning information.

20. The method of claim 19, wherein the central controller is a Third Generation Partnership Project Fifth Generation (5G) Central Unit (CU) or Distributed Unit (DU), wherein the C-RAN implements a 5G air interface to communicate with a plurality of RUs.

21. The method of claim 19, wherein the central controller is a baseband controller, wherein the C-RAN implements a Third Generation Partnership Project Long Term Evolution air interface to communicate with a plurality of RUs.

22. The method of claim 19, wherein the activation server information comprises any of the following:
a username and a password for the central controller to use when accessing the activation server;
an Internet Protocol (IP) address or fully qualified domain name (FQDN) of the activation server; and
a port number of the activation server.

23. The method of claim 19, wherein the commissioning information comprises information about at least one security gateway that is used by the central controller to securely connect to an operator's network.

24. The method of claim 19, wherein the commissioning information comprises information about an IP Security (IPSec) tunnel to be used for data bearer traffic.

25. The method of claim 19, wherein the commissioning information comprises an indication of a reference clock to which the central controller should synchronize.

26. The method of claim 19, wherein the commissioning information comprises a list of remote units (RUs), which are communicatively coupled to the central controller and that the central controller should allow to connect during a discovery process.

27. The method of claim 19, wherein the commissioning information comprises information used by the central controller to derive IP addresses to assign to a plurality of RUs to which the central controller is communicatively coupled via a fronthaul network.

28. The method of claim 19, wherein the commissioning information comprises at least one ROOT certificate for the central controller to use when setting up at least one secure connection with an operator's network.

29. The method of claim 19, wherein the commissioning information comprises a license file indicating at least one feature that has been licensed for use in the central controller.

30. The method of claim 19, wherein the commissioning information comprises an indication of an addressing model to use when communicating with an operator's network.

31. The method of claim 30, wherein the addressing model indicates Internet Protocol version 4 (IPv4) or Internet Protocol version 6 (IPv6).

32. The method of claim 19, wherein the commissioning information comprises a single/dual tunnel indicator that indicates whether an operator of the central controller combines operations, administration, and management (OAM) traffic on a same tunnel as user data traffic.

33. The method of claim 19, wherein the commissioning information comprises Simple Network Management Protocol (SNMP) server information in an operator's enterprise network for the central controller to contact with alarms in response to failures.

34. The method of claim 19, wherein the commissioning information comprises Global Positioning System (GPS) coordinates of the central controller and a plurality of RUs to which the central controller is communicatively coupled via a fronthaul network.

35. The method of claim 19, wherein the commissioning information comprises control traffic flow information indicating whether or not the central controller should combine timing packets and IPSec packets into a single ETHERNET port.

36. The method of claim 19, wherein the commissioning information comprises information for an authentication server that implements a directory service the central controller can access for user authentication.

* * * * *